United States Patent [19]

Ittner

[11] 4,173,307
[45] Nov. 6, 1979

[54] LOAD BEARING VANE STRUCTURE FOR THRUST REVERSAL

[75] Inventor: Nelson C. Ittner, Blue Jay, Calif.

[73] Assignees: Harry Feick Co., Inc.; JRS Mfg. Inc., both of Los Angeles, Calif.

[21] Appl. No.: 846,548

[22] Filed: Oct. 28, 1977

Related U.S. Application Data

[62] Division of Ser. No. 680,173, Apr. 26, 1976, Pat. No. 4,067,094.

[51] Int. Cl.² ............................................. B64C 15/04
[52] U.S. Cl. ............................ 239/265.29; 244/110 B
[58] Field of Search ...................... 239/265.27, 265.29, 239/265.31; 244/12.5, 23 D, 110 B; 60/226 A, 228, 229, 230, 232; 29/156.8 R

[56] References Cited

U.S. PATENT DOCUMENTS

| | | | |
|---|---|---|---|
| 2,960,822 | 11/1960 | Bertin | 239/265.27 |
| 3,024,603 | 3/1962 | Tschudy | 239/265.29 |
| 3,279,181 | 10/1966 | Beavers et al. | 60/226 A |
| 3,794,246 | 2/1974 | Weise | 60/229 X |
| 3,802,046 | 4/1974 | Wachtell et al. | 29/156.8 R |

Primary Examiner—Robert B. Reeves
Assistant Examiner—Andres Kashnikow
Attorney, Agent, or Firm—Ralph B. Pastoriza

[57] ABSTRACT

The vane structure fits within a side opening of an aircraft jet engine normally covered by a pivoted clam shell arrangement. When the clam shell arrangement is actuated, it swings from the side opening in a direction to intercept thrust gases normally passing rearwardly of the engine and direct the gases laterally out of the side opening, the vane structure directing the gases upwardly and forwardly to provide a reverse thrust. The vane structure itself includes a number of beams lying in parallel vertical planes and a number of vanes in the form of continuous strips extending transversely to the direction of the beams, the beams having slots through which the vanes pass to define an egg crate like interlocked grid structure. The vanes are tilted forwardly slightly relative to the vertical to provide the forward component of gas movement creating the reverse thrust.

3 Claims, 7 Drawing Figures

U.S. Patent  Nov. 6, 1979  Sheet 1 of 2  4,173,307
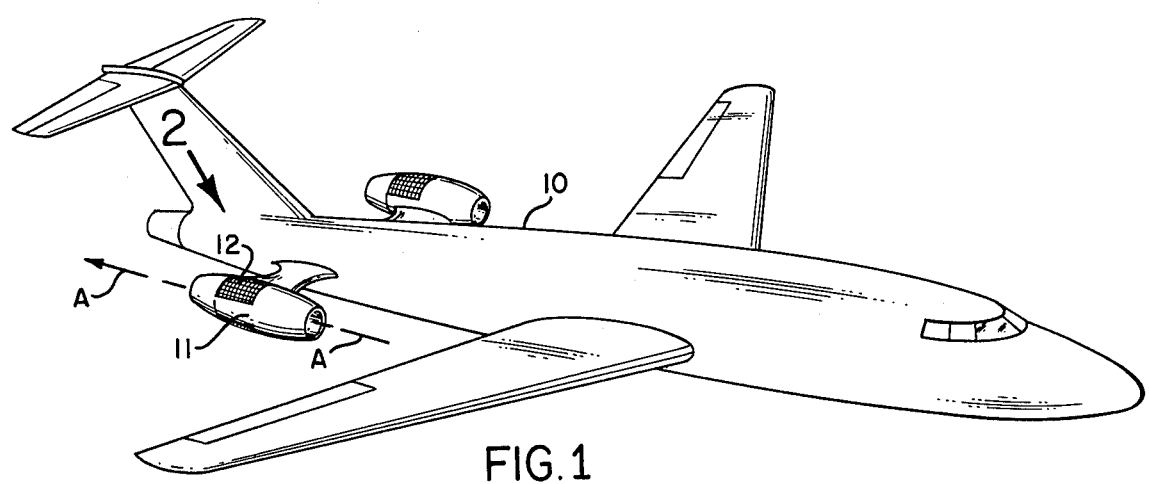
FIG.1
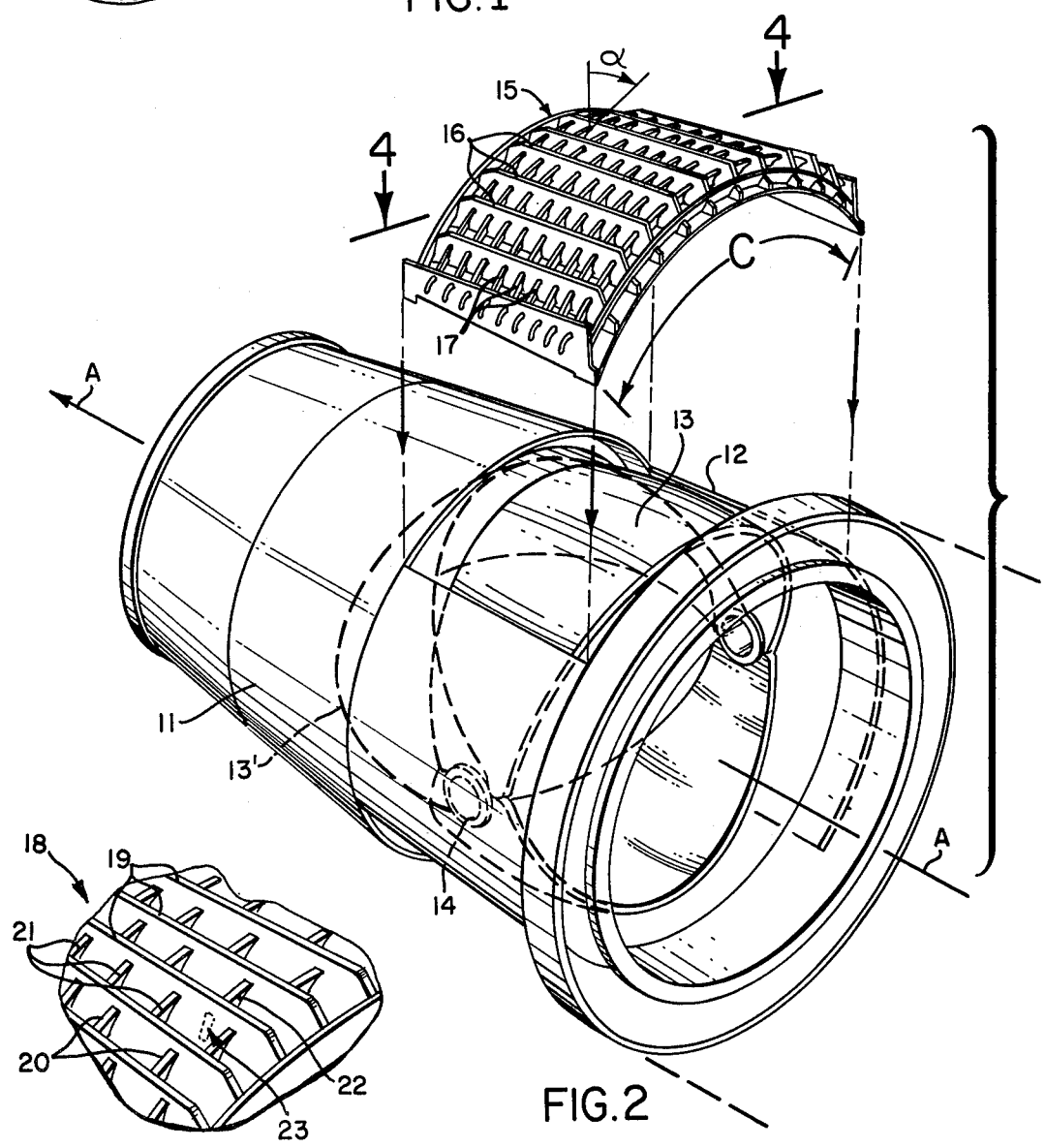
FIG.2
Prior Art
FIG.3

LOAD BEARING VANE STRUCTURE FOR THRUST REVERSAL

This is a division of application Ser. No. 680,173 filed on Apr. 26, 1976 and entitled LOAD BEARING VANE STRUCTURE FOR THRUST REVERSAL, now U.S. Pat. No. 4,067,094 issued Jan. 10, 1978.

This invention relates to the braking of jet aircraft by thrust reversal and more particularly to a load bearing vane structure and method of assembling the same for installation on a jet engine to effect such thrust reversal.

BACKGROUND OF THE INVENTION

It is common practice in many commercial and military jet aircraft to brake the aircraft upon landing by effectively reversing the thrust of the jet engines. The most common arrangement for providing such thrust reversal is to provide a pair of clam shell shaped members pivoted within the engine housing to swing from a position eclipsing side openings in the engine to a position intercepting the thrust gases normally passing rearwardly of the engine thereby directing the gases laterally out of the side openings. Simultaneously with the swinging movement of the clam shell structures, doors or partitions normally covering the side openings swing upwardly and serve as a deflection or baffle wall for further guiding the laterally deflected thrust gases forwardly thus providing the desired reverse thrust action.

The provision of the swinging door arrangements for cooperation with the clam shell structures in providing thrust reversal represents a substantial additional expense as well as an increase in weight of the overall aircraft. Moreover, there are many mechanical and hydraulic accessories necessary to operate such doors and as a consequence careful and periodic maintenance is required to assure reliability and safety.

More recently, it has been proposed and actually placed in operation, the provision of a grid-like vane structure fitted within the opening normally exposed when the clam shell structures pivot to deflect the thrust gases laterally. The vane structure is used in place of a swinging door structure and is a fixed installation; that is, there are no moving parts. The vanes in the grid structure are tilted forwardly slightly to provide the necessary forward component of gas movement necessary to realize a thrust reversal reaction. When the clam shell structures are in their normal inoperative position, they simply underlie the grid-like vane structure.

The foregoing proposed vane structures have greatly decreased maintenance cost, increased reliability and decreased the overall weight of the engines as compared to the prior swinging door type arrangements. On the other hand, there have been encountered numerous difficulties with the vane structures presently proposed. More particularly, the presently proposed and used vane structures include a plurality of beams or "strong backs" as they are referred to in the art extending generally in parallel vertical planes. Between these beams there are welded small individual vanes extending transversely between adjacent beams. The vanes are generally staggered in order that the ends of each of the individual vanes can be properly welded to the inside opposed surfaces of the beams. This staggered arrangement is necessary in order that a chill block may be backed against the opposite side of the beam to which one end of a vane is to be welded. If the vanes were in alignment in a transverse direction, proper welding could not really be effectively carried out.

The process or method of assembling the vane structure is thus time consuming and expensive and further, the final welds themselves are not always reliable and tend to develop cracks.

As a further consequence of the foregoing type of assembly, it will be evident that each of the individual vanes welded into position must carry a load or constitute a load bearing element when deflecting the thrust gases to provide the reverse thrust. Thus, unless each and every one of the vanes are properly welded in position, one or more may work loose or be blown out. Particular trouble has been encountered in those vanes along the sides of the vane structure; that is, those vanes positioned between the first and second beams from each side or those vanes furthest from the center of the grid. It is believed that one reason for the greater weakness in these latter mentioned vanes is the fact that the chord length of the vanes is greater at the sides than towards the center of the vane structure as a consequence of the overall convex curved surface in which the vane structure lies to conform to the circumferential extent of the side opening of the engine.

BRIEF DESCRIPTION OF THE PRESENT INVENTION

Bearing the foregoing considerations in mind, the present invention contemplates a greatly improved load bearing vane structure for thrust reversal and method of assembling the same wherein the various disadvantages encountered with the presently known latest versions of vane structures for thrust reversal are avoided.

Briefly, in accord with the method of providing the vane structure of this invention, a plurality of beams are positioned and held in parallel vertical planes, the medial longitudinal lines of the beams following a convex curved surface when viewed from above to conform to the side opening of the aircraft jet engine. Individual slots are formed in the beams by an electric discharge machining process, each of the slots having predetermined angulated edges. Successive vanes in the form of elongated strips are then passed through correspondingly aligned slots in a transverse direction in the beams to provide an egg crate like interlocked grid structure, the predetermined angulated edges of the successive slots being formed as required to provide a minimum clearance when each vane is passed through all of the beams in a manner to follow the convex curved surface configuration. The vanes are then brazed to the beams at the points they pass through the slots.

The resulting construction provides for a highly reliable and high strength thrust reversing grid structure in that the various transverse vanes are all continuous rather than constituting individual staggered elements as in the prior art.

In accord with a further feature of this invention, the parallel planes within which the beams lie are progressively spaced closer together in a direction starting from the center of the convex surface towards the outer sides such that the chord lengths of each vane between successive beams through which it passes are all equal. There is thus provided equal and proper support for the vanes along their entire transverse extent so that there is no tendency for the outer vanes to become more weakened than those in the central portion of the structure.

BRIEF DESCRIPTION OF THE DRAWINGS

A better understanding of this invention will be had by now referring to the accompanying drawings in which:

FIG. 1 is a perspective view of a typical jet aircraft incorporating jet engines with load bearing vane structures for thrust reversal in accord with the present invention;

FIG. 2 is a greatly enlarged exploded fragmentary perspective view of one of the engines of the jet aircraft of FIG. 1 showing the vane structure in exploded relationship to the engine;

FIG. 3 is a fragmentary perspective view of a portion of a prior art type of vane structure;

DETAILED DESCRIPTION OF THE PREFERRED EMBODIMENT

Figure 4:
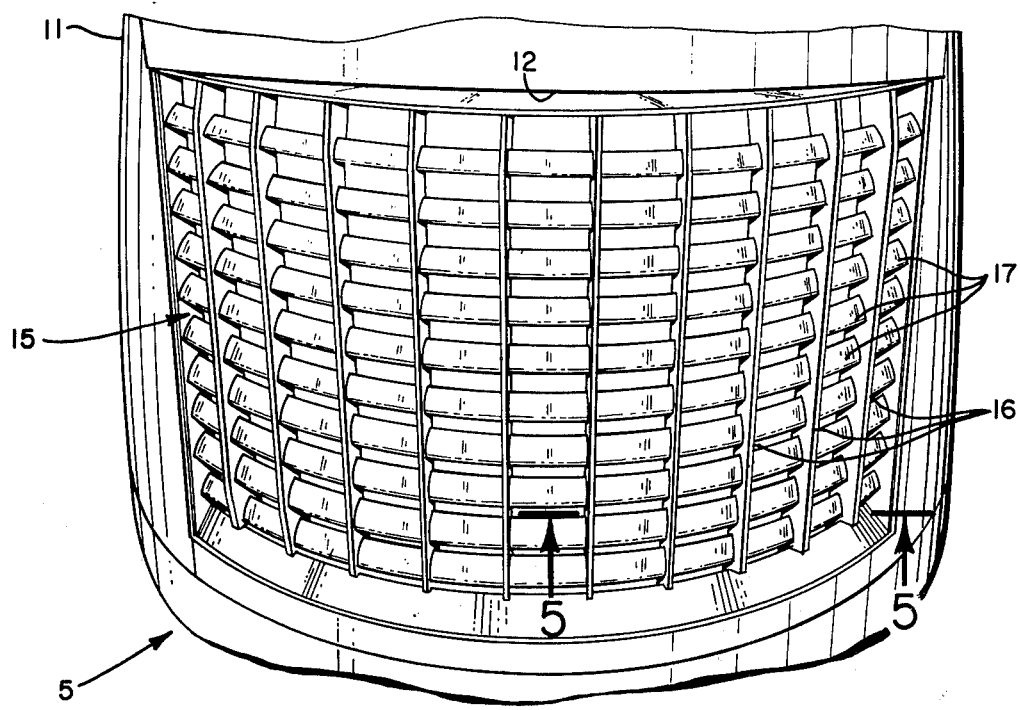
FIG. 4 is an enlarged top plan view looking in the direction of the arrows 4—4 of FIG. 2 showing the vane structure fitted in the opening of the jet engine.

Referring to FIG. 1 there is shown a typical jet aircraft 10 provided with a pair of jet engines one of which is shown at 11 with a side opening 12. The normal thrust direction of gases from the engine 11 is in a rearward direction along the axis A—A of the engine.

As mentioned heretofore, one of the prior art means for reversing the thrust of the gases was to provide outer doors normally covering the opening 12 and adapted to swing upwardly from rear hinges to an angle such as to deflect gases directed laterally from the opening by an appropriate clam shell arrangement in a forward direction.

In the evolution of the foregoing technology, and as also mentioned heretofore, it has been proposed and there are presently in use grid structures within the opening 12 incorporating vanes tilted appropriately to serve the same function as the swinging door.

Referring now to the enlarged view of the engine 11 in FIG. 2, the known and usual clam shell means or structure for initially intercepting the thrust gases and directing them laterally through the opening 12 is indicated at 13 pivoted for swinging movement about a transverse axis at point 14. Essentially, the clam shell structure swings from a position covering the side opening 12 in the engine to a position intercepting the thrust gases as indicated at 13' in FIG. 2 by the dotted lines to direct the gases laterally out of this side opening. When normal operation is to resume, the clam shell structure 13 is pivoted or swung back about the pivot point 14 to its solid line position illustrated in FIG. 2.

The load bearing vane structure of the present invention is illustrated in exploded view generally by the numeral 15 and includes a plurality of beams 16 extending parallel to each other in side-by-side vertical planes generally in the direction of the thrust axis A—A when the vane structure is positioned in the side opening 12. The beams 16 are in the form of elongated narrow flat plates and are often referred to in the art as "strong backs".

A plurality of vanes 17 generally in the form of elongated continuous strips extend transversely to the direction of the beam 16, the beams having slots through which the vanes pass to define an egg crate like interlocked grid structure. It will be noted that this entire vane structure follows a convex curved surface when viewed from above corresponding to the circumferential extent designated by the double headed arrows C in FIG. 2 of the side opening so as to fit therein and conform to the cylindrical curvature of the engine.

It will also be noted that because each of the vanes 17 constitutes a continuous strip, the portions of the vanes passing between the beams 16 are all in transverse alignment.

Referring now to FIG. 3 there is illustrated in fragmentary form at 18 a portion of a prior art type of vane structure wherein again there are provided beams 19. However, in contradistinction to continuous strips forming the vanes, there are provided instead a series of individual vanes between successive adjacent beams such as indicated at 20, 21 and 22, these individual vanes being staggered in the transverse direction.

In the assembly of the prior art structure of FIG. 3 each of the individual vanes 20, 21 and 22 have their ends welded to the inside opposed surfaces of the adjacent beams 19. Effective welding can only take place by providing a "chill block" against the back of the beam portion to which a vane is to be welded. For example, in FIG. 3 the vane 22 when weleded to the near beam 19 would require a chill block to be placed at the point 23. Any next vane segment in alignment in a transverse direction would interfere with the positioning of the chill block which results in the necessity of staggering the vanes as shown.

From the foregoing, it can be immediately appreciated that a great structural advantage ensues from the use of continuous strips for the vanes passing through appropriately formed slot openings in the beams.

In FIG. 2, it will be noted that the continuous strips making up the vanes 17 are tilted forwardly at an angle $\alpha$ to the vertical. Further, and as will become clearer as the description proceeds, the vanes are curved in the direction of the tilt from their bottom to top edges to provide a smooth guiding surface for the laterally directed gases in the deflection thereof in an upward and forward direction.

All of the foregoing can better be appreciated by now referring to FIG. 4 which illustrates the vane structure 15 secured within the opening 12 of the engine 11.

It will be immediately appreciated from the plan view of FIG. 4 that the vertical planes within which the beams 16 lie are progressively spaced closer together in a direction starting from the center of the convex surface towards the outer sides. This spacing is such that the chord lengths of each vane 17 between successive beams through which it passes are all equal.

Figure 5:
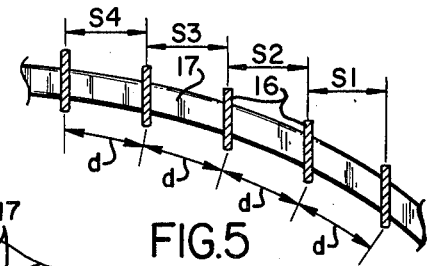
FIG. 5 is a fragmentary cross section taken in the direction of the arrows 5—5 of FIG. 4.

The foregoing can be better appreciated by reference to the fragmentary cross section of FIG. 5 wherein the spacing between the vertical planes incorporating the beams 16 starting from an outer edge towards the center are designated s1, s2, s3 and s4, the spacing progressively increasing from the side towards the center so that in effect the spacing progressively decreases in a direction from the center towards the side.

The corresponding chord lengths between adjacent beams for the vanes 17 are designated at d and it will be noted that these chord lengths are all equal. As a result, there is provided uniform and equal support for the vane by the beams over their entire extent.

Figure 6:
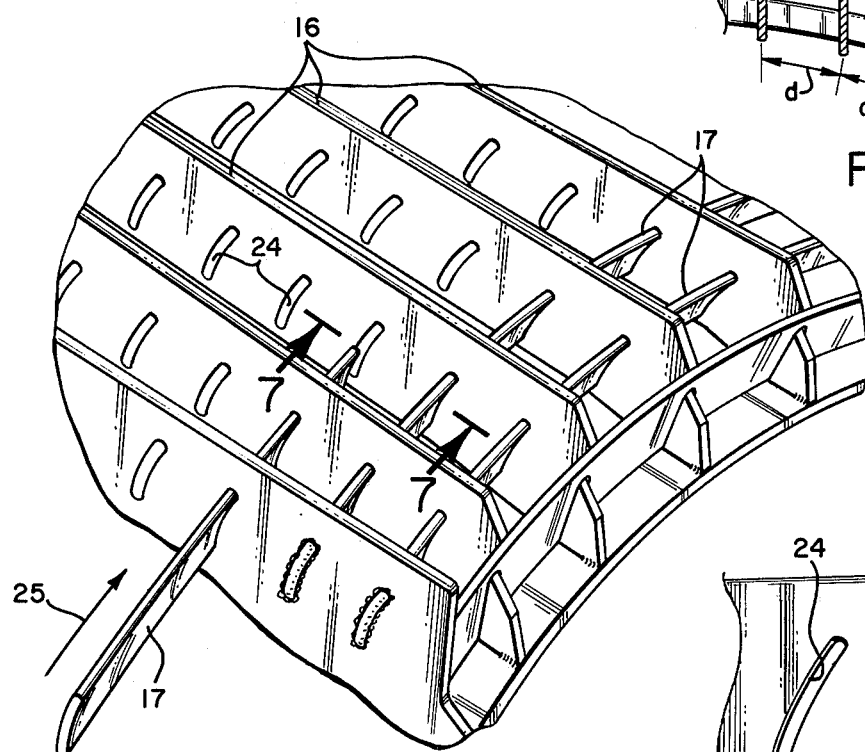
FIG. 6 is an enlarged perspective fragmentary view of a portion of the vane structure useful in explaining certain steps in the assembly thereof; and, FIG. 7 is an enlarged fragmentary cross section taken in the direction of the arrows 7—7 of FIG. 6.

FIG. 6 illustrates in fragmentary view one of the assembly steps in accord with the method of making up the improved vane structure of this invention. Thus, the plurality of beams 16 are initially held by an appropriate jig such that they lie in parallel vertical planes with their medial lines following the convex curved surface as described. Individual slots indicated at 24 in FIG. 6 are formed in the beams 16 preferably by an electrical discharge machining operation. Because of the compound curvature of the vanes 17; that is, their bottom and top edges follow the curve of the convex surface within which the entire structure lies and in addition there is a camber or curvature between the bottom and top edge in the direction of tilting of the vane, it is necessary to predetermine the angles of the edges of the slots 24 for each of the specific beams in order that when the vanes pass therethrough a minimum clearance results.

Accordingly, after various slots 24 have been formed and with the beams 16 positioned as shown, the individual vanes 17 may be inserted or threaded through the slots in one direction as indicated by the arrow 25 for one of the vanes 17. As stated, the predetermined angular edges of the successive slots are such as required to provide the desired minimum clearance.

After all of the vanes have been inserted, they are brazed to the beams at the points where they pass through the slots.

Figure 7:
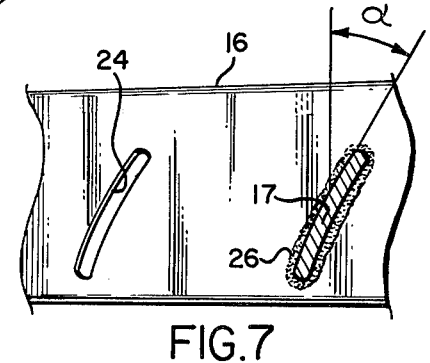

In the fragmentary cross section of FIG. 7, one of the slots 24 is shown in detail prior to insertion of a vane therethrough. The angulation of the edges of the slot 24 will be evident from this view. Also in FIG. 7 there is shown a next adjacent slot to the right of the slot 24 through which a vane 17 has already been inserted, the vane being shown in cross section. The brazing material is indicated at 26 at the points where the vane passes through the opening. The degree of tilt indicated by the angle $\alpha$ with respect to the vertical is shown and further, the camber or curving of the vane between its bottom and top edges in the direction of the tilt will be evident. This curvature provides a smooth guiding surface for the laterally deflected gases so that there will be provided a forward component of movement of the gases to provide the desired reverse thrust.

With reference once again to FIG. 2, it will be understood that there is provided an identical vane structure to that indicated at 15 for the underside of the engine 11 which includes a similar diametrically opposite opening 12 cooperating with a second clam shell similar to 13 and pivoted about the same pivot point 14.

The load bearing vane structures may be secured within the openings 12 by simple bolts spaced along the forward and rear arcuate edge portions of the structure to the forward and rear arcuate edges of the opening 12. The vane structures thus constitute permanent fixtures to the engine 11 and no moving parts are involved in providing reverse thrust except the movement of the normally provided clam shell structure.

Because of the specific constructional features of the vane structure of this invention wherein each vane is a continuous elongated strip, great structural integrity is assured and the vanes themselves can readily carry the load imposed in the reversal of direction of gas flow. In other words, the problem associated with prior art grid structures wherein individual short vanes were welded between opposed walls of the beams with the attendant risk of cracks and the like developing in the wells and one or more of the individual vanes working loose is wholly eliminated by the present invention.

From all of the foregoing, it will thus be evident that the present invention has provided a greatly improved lead bearing vane structure for thrust reversal which avoids disadvantages of those available heretofore.

What is claimed is:

1. A load bearing vane structure for reversing the thrust direction of a jet engine wherein pivoted clam shell means are provided to swing from a position covering a side opening in the engine to a position intercepting the thrust gases normally passing rearwardly of the engine thereby directing the gases laterally out of said side opening, said vane structure comprising:
    (a) a plurality of beams extending parallel to each other in side-by-side vertical planes generally in the direction of the thrust axis of said engine when said vane structure is positioned in said side opening; and,
    (b) a plurality of vanes in the form of elongated continuous strips extending transversely to the direction of said beams, said beams having closed slots through which said vanes pass to define an egg crate like interlocked grid structure, said entire vane structure following a convex surface when viewed from above corresponding to the circumferential extent of said side opening so as to fit therein, each of said vanes being tilted in a forward direction so that when said clam shell means intercepts and directs said gases laterally, said vanes guide said gases upwardly and forwardly, the forward component of movement of the gases providing a reverse thrust, the vertical planes within which the beams lie being progressively spaced closer together in a direction starting from the center of said convex surface towards the outer side such that the chord lengths of each vane between successive beams through which it passes are all equal.

2. A vane structure according to claim 1, in which each of said vanes is curved to define a camber between its bottom and top edges towards the direction of its tilt to define a smooth guiding surface for said gases.

3. A vane structure according to claim 1, including material brazing the vanes in the slots through which they pass to provide a rigid assembly.

* * * * *